April 1, 1930. F. P. RYDER 1,752,577
FEEDING DEVICE FOR THRASHING MACHINES
Filed July 20, 1928 2 Sheets-Sheet 2
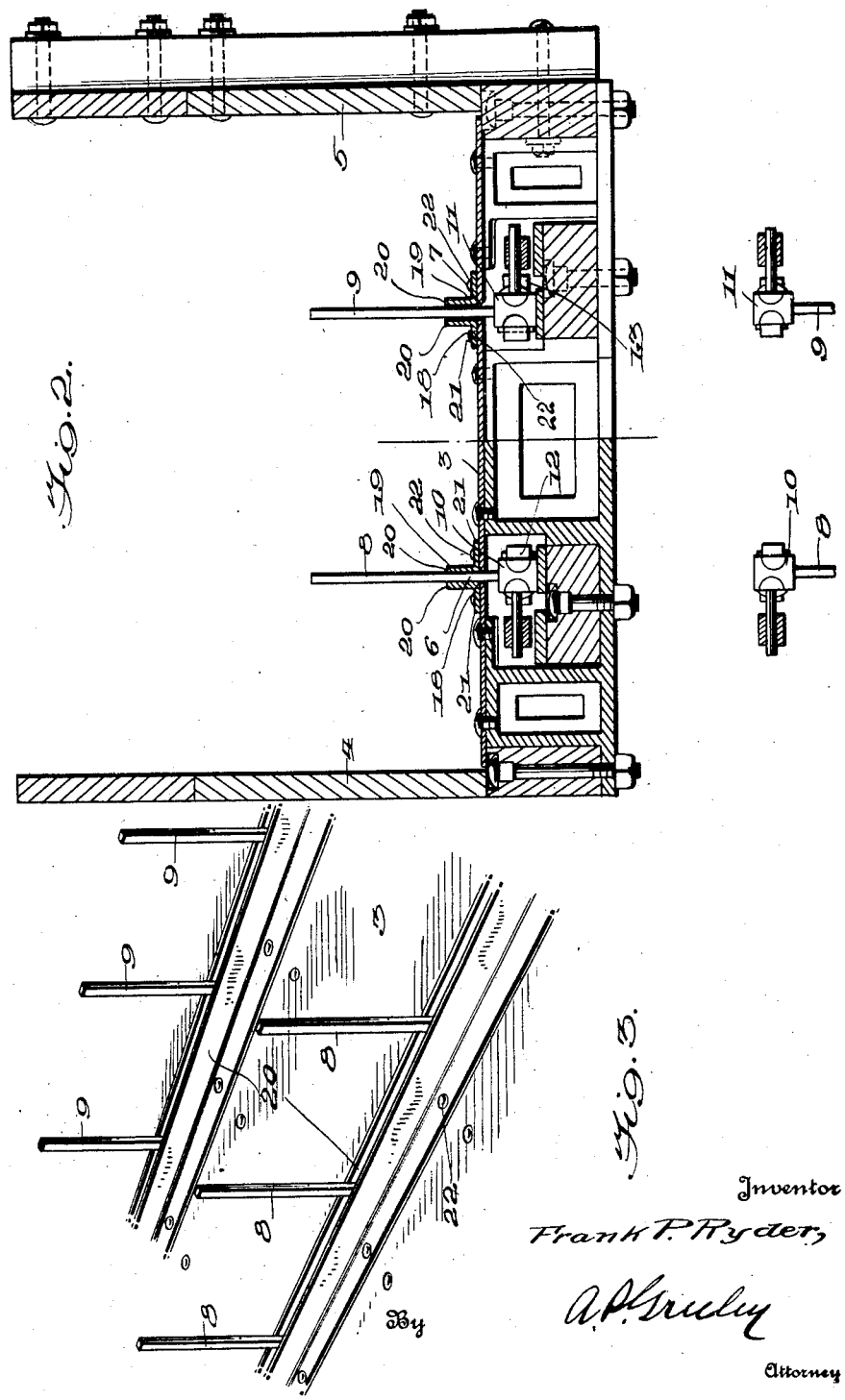
Inventor
Frank P. Ryder,
By
Attorney Patented Apr. 1, 1930

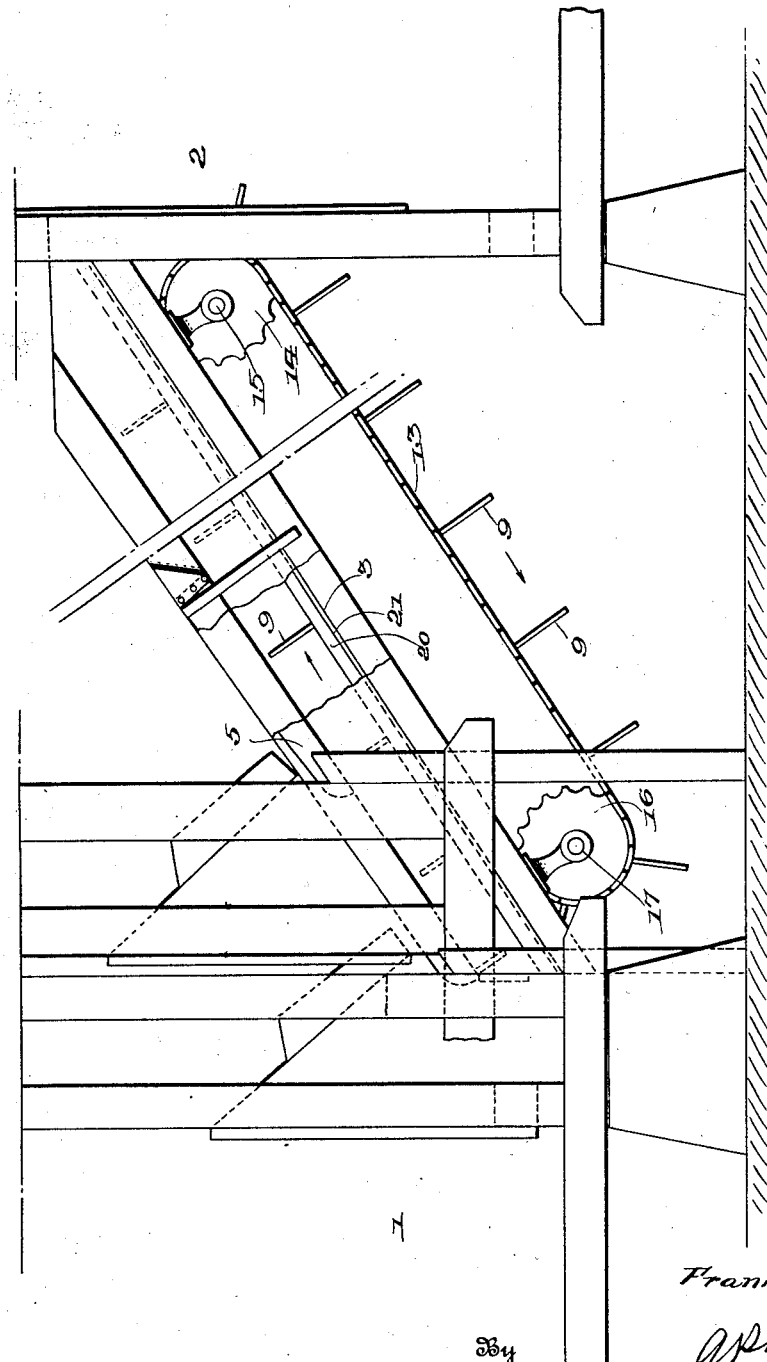

1,752,577

UNITED STATES PATENT OFFICE

FRANK PITTIS RYDER, OF NIAGARA FALLS, NEW YORK

FEEDING DEVICE FOR THRASHING MACHINES

Application filed July 20, 1928. Serial No. 294,207.

My invention relates to feeding devices for feeding or conveying partly thrashed bean, pea or other bushes or vines from one thrashing machine to another.

In harvesting lima beans or peas the vines or bushes on which the beans or peas are grown are fed to machines usually termed viners in which they are subjected to the action of revolving beater arms by which the pods are caused to open to discharge the beans or peas which are allowed to escape through suitable screens, the bushes or vines from which the beans or peas have been removed being discharged from the machine and carried away by a suitable conveyor. Ordinarily in harvesting peas a single viner only is used, all of the peas, including those which are too mature to be considered fancy as well as those less mature, being readily separated by a single operation, the mature or hard peas being later separated from those suitable for a fancy grade, the difference in size of the mature and immature peas being such as to facilitate the separation.

In harvesting lima beans it is found that beans too mature for canning as fancy are distinguished from those suitable for a fancy grade rather by color than by size, the mature lima bean being white while the bean desirable for fancy grade is green. The change of the bean from green to white often takes place within a few hours and without material change in size. It is therefore more difficult to separate fancy green lima beans from the white mature beans by screening. It is, however, found that the pods containing mature lima beans are more readily opened by relatively gentle blows of the beater arms of the viner than are those in which the desirable green beans are contained and it is found that by subjecting the vines to the action of beater arms revolving at relatively slow speed the mature, or white, beans may be set free leaving the pods containing the less mature or green beans unopened and it has become a practice to feed the vines or bushes first to a viner in which the beater arms revolve at relatively slow speed and to convey the vines or bushes to a second viner in which the beater arms revolve at relatively high speed to effect the opening of the pods left unopened by the first viner, in other words, to arrange the two viners tandem with a conveyor for moving the vines or bushes from the discharge opening of the first viner to the inlet of the second.

The conveyor used ordinarily consists of conveyor fingers carried by an endless chain moving in open longitudinal slots in a bottom plate arranged at a suitable inclination.

The operation of the first viner being intentionally incomplete, the bushes or vines discharged from it carry with them many loose beans and these tend to drop into the slots in which the conveyor fingers move to either drop through or to be caught and crushed by the fingers.

It is the object of my present invention to provide means by which loose beans will be prevented from entering the slot in which the conveyor fingers move.

With this object in view my invention consists in the construction and combination of elements hereinafter described and claimed.

Referring to the drawings:

Figure 1 is a side view, partly broken away, of a conveyor for moving bushes or vines from a first viner to a second viner.

Figure 2 is a cross sectional view of Figure 1, and

Figure 3 is a perspective view of the conveyor.

In the drawings 1 indicates a viner arranged at a suitable elevation and 2 indicates a second viner arranged in tandem. 3 indicates the bottom plate of a conveyor leading from the discharge opening of viner 1 to the inlet or feed opening of viner 2 arranged at such inclination as to overcome the difference in elevation between the discharge chute of viner number 1 and the feed hole of viner number 2. 4 and 5 indicate the sides of the conveyor. 6 and 7 indicate the longitudinal slots in the bottom plate 3 for the conveyor fingers 8 and 9. These fingers are secured at their lower ends to links 10 and 11 of endless chains 12 and 13, which are carried on sprockets 14 on shaft 15 near the upper end of bottom plate 3 and sprockets 16 on shaft 17 near its lower end. One or the other of the shafts 16 or 17 is to be power driven to cause the conveyor arms 8 and 9 to move upward in slots 6 and 7, carrying with them the vines or bushes discharged from viner 1.

Along the sides of slots 6 and 7, I arrange angle irons 18 and 19, with their upwardly extending flanges 20 parallel with the edges of the slots, their horizontal flanges 21 being secured to the bottom plate 3 by bolts or other securing means 22. The upwardly extending flanges 20 protect the slots 6 and 7 against entrance of loose beans sliding across bottom 3 as the vines are pushed along by fingers 8 and 9. These upwardly extending flanges are the essential features of my invention and whether they form a part of the angle irons shown or are otherwise formed is not particularly important so long as they extend upward along the edges of the slots a sufficient distance to effectively guard the slots against entrance into them of loose beans or other loose objects sliding along bottom 3.

It will, of course, be understood that while my invention is described for use in harvesting lima beans it is not limited to this use but may be used wherever conveyor arms moving in slots are used for moving material containing more or less objects of such shape or size as might drop into the slots if unprotected.

Having thus described my invention what I claim is:

In a conveyor having a bottom plate provided with slots and conveyor arms movable in said slots, upwardly extending guards arranged along the edges of the slots consisting of angle irons having their vertical flanges extending upward along the edges of the slots and their horizontal flanges secured to the bottom plate.

In testimony whereof, I hereunto affix my signature.

FRANK PITTIS RYDER.